(12) United States Patent  
Licona et al.

(10) Patent No.: US 8,953,425 B1  
(45) Date of Patent: *Feb. 10, 2015

(54) NRZI PROCESSING METHODS AND DEVICES TO CORRECT FOR SYNC DETECTION FAILURES

(71) Applicant: Marvell International Ltd., Hamilton (BM)

(72) Inventors: Estuardo Licona, Milpitas, CA (US); Mats Oberg, San Jose, CA (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 14/330,490

(22) Filed: Jul. 14, 2014

Related U.S. Application Data

(63) Continuation of application No. 13/628,800, filed on Sep. 27, 2012, now Pat. No. 8,797,833.

(60) Provisional application No. 61/540,427, filed on Sep. 28, 2011.

(51) Int. Cl.  
*G11B 7/004* (2006.01)  
*G11B 20/18* (2006.01)

(52) U.S. Cl.  
CPC .................................... *G11B 20/18* (2013.01)  
USPC ................. 369/53.35; 369/47.48; 369/47.28; 369/53.34; 369/53.16; 714/798

(58) Field of Classification Search  
USPC .......... 369/47.48, 47.28, 53.34, 30.25, 53.16, 369/59.25, 124.07, 30.22, 53.35; 714/707, 714/731, 798  
See application file for complete search history.

(56) References Cited

U.S. PATENT DOCUMENTS

| | | | |
|---|---|---|---|
| 6,198,705 B1 * | 3/2001 | Tran et al. | 369/32.01 |
| 6,611,393 B1 * | 8/2003 | Nguyen et al. | 360/53 |
| 6,967,799 B1 * | 11/2005 | Lee | 360/51 |
| 6,986,007 B1 * | 1/2006 | Procyk et al. | 711/154 |
| 7,024,614 B1 * | 4/2006 | Thelin et al. | 714/770 |
| 7,193,797 B1 * | 3/2007 | Sun et al. | 360/31 |
| 7,213,192 B2 * | 5/2007 | James | 714/769 |
| 8,797,833 B1 * | 8/2014 | Licona et al. | 369/53.35 |
| 2007/0223538 A1 * | 9/2007 | Rodgers | 370/512 |
| 2008/0178301 A1 * | 7/2008 | Tsai | 726/32 |
| 2009/0052294 A1 * | 2/2009 | Honma | 369/59.19 |

* cited by examiner

*Primary Examiner* — Thomas Alunkal

(57) ABSTRACT

New and useful methods and systems for detecting sync signals/patterns in streams of data are disclosed. For example, in an embodiment system for processing data includes a first module having dedicated processing circuitry configured to detect a sync signal embedded in a received stream of data and to produce an output stream of data, and second module that includes a firmware-controlled processor configured to correct sufficient errors within the received stream of data so as to allow the first module to detect the sync signal on a condition when the first module by itself is incapable of resolving the sync signal caused by the errors in the received stream of data.

20 Claims, 5 Drawing Sheets

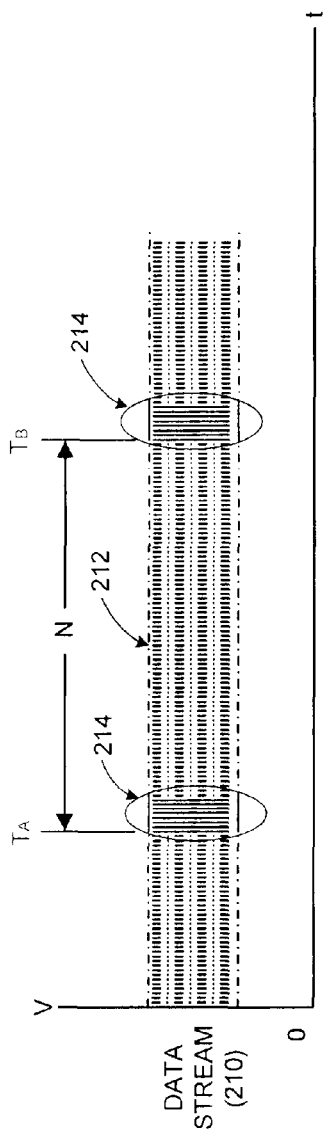
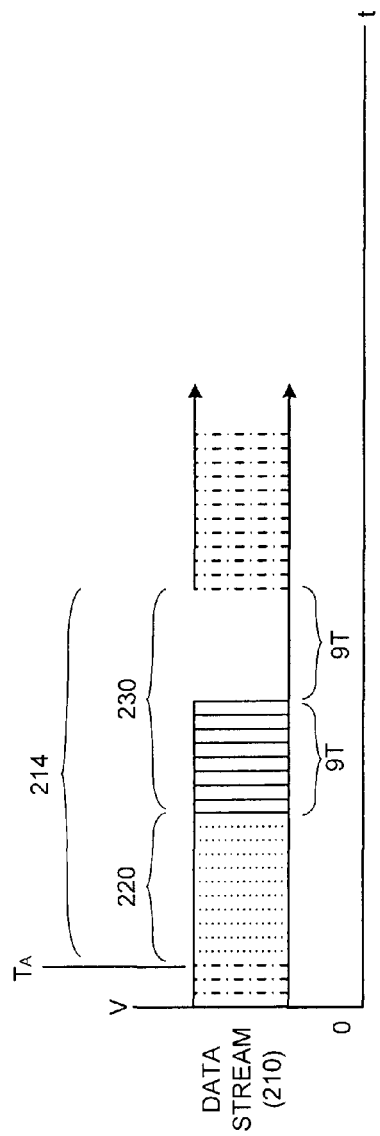
-- PRIOR ART --
FIG. 1A
-- PRIOR ART --
FIG. 1B

ND DRZI PROCESSING METHODS AND
DEVICES TO CORRECT FOR SYNC
DETECTION FAILURES

INCORPORATION BY REFERENCE

This application is a continuation of U.S. application Ser. No. 13/628,800, filed on Sep. 27, 2012, now issued as U.S. Pat. No. 8,797,833, which claims priority under 35 U.S.C. §119(e) to U.S. Provisional Application No. 61/540,427, filed on Sep. 28, 2011. The disclosures of the applications referenced above are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Communication and data storage systems rely on any of a variety of encoding systems. For example, optical disc readers use NRZI (non-return to zero, inverted) coding in which 1's are represented by a first type condition, e.g., a change in voltage/state at a clock boundary, and 0's are represented by some other type condition, e.g., no change in voltage/state at a clock boundary. Unfortunately, such systems are susceptible to timing issues. For instance, a sync detection loss of an input stream of data from an optical disc will lead to large numbers of detected errors even though the input data stream actually contains very few actual data errors.

SUMMARY

Various aspects and embodiments of the invention are described in further detail below.

In an embodiment, a system for processing data includes a first module having dedicated processing circuitry configured to detect a sync signal embedded in a received stream of data and to produce an output stream of data, and a second module that includes a firmware-controlled processor configured to correct sufficient errors within the received stream of data so as to allow the first module to detect the sync signal on a condition when the first module by itself is incapable of resolving the sync signal caused by the errors in the received stream of data.

In another embodiment, a method for processing data is disclosed. The method includes performing first processing using only dedicated processing circuitry configured to detect a sync signal embedded in a received stream of data to produce an output stream of data, and when the first processing is incapable by itself of resolving the sync signal due to errors in the received stream of data, performing second processing using a firmware-controlled processor to correct sufficient errors within the received stream of data so as to allow the first module to detect the sync signal.

BRIEF DESCRIPTION OF THE DRAWINGS

Various embodiments of this disclosure that are proposed as examples will be described in detail with reference to the following figures, wherein like numerals reference like elements, and wherein:

FIGS. 1A and 1B depict optical data provided by a BluRay Disc (BD).

DETAILED DESCRIPTION OF EMBODIMENTS

Figure 2:
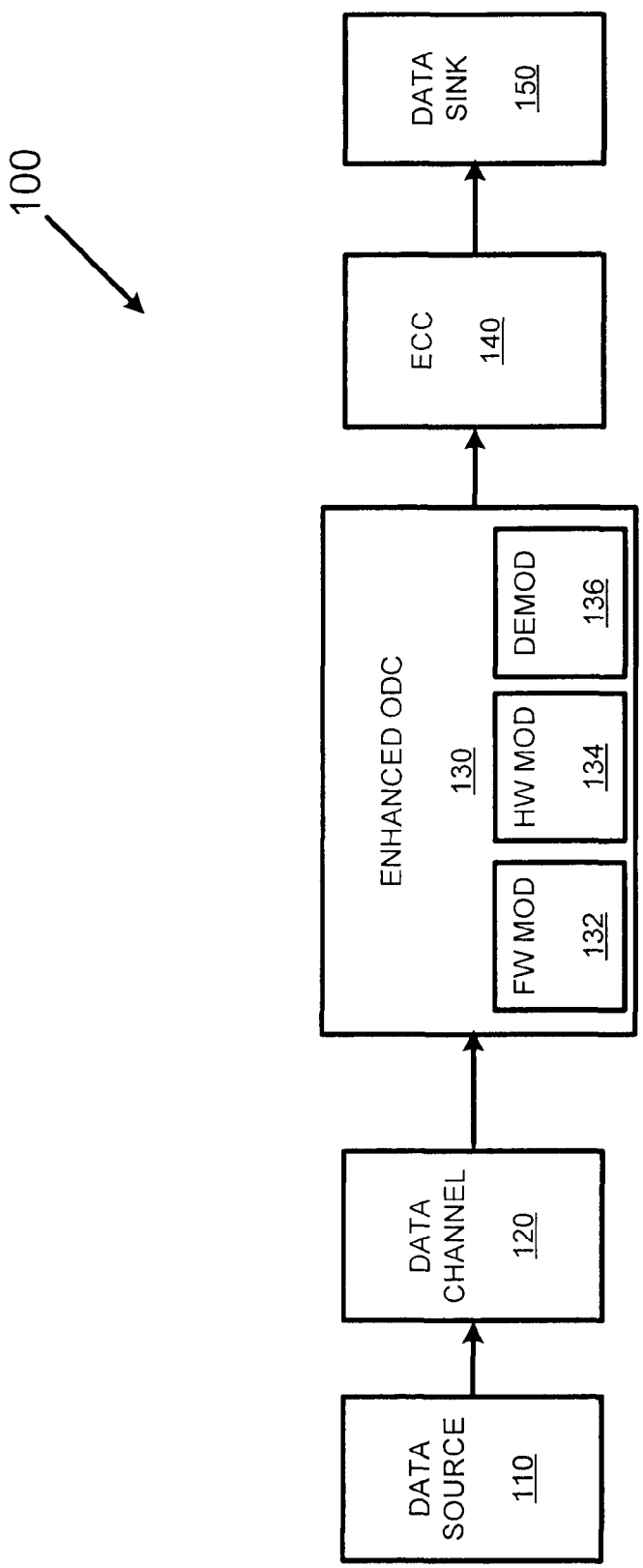
FIG. 2 is an example of a system employing NRZI encoded data and sync signals.

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

FIG. IA depicts an input data stream 210 provided by a BluRay Disc (BD) and used by the BD storage system 100 of FIG. 2 as will be explained below. The optical data stream 210 includes frames of date with each frame including payload data 212 of 1932 bits and a sync signal 214.

For the purpose of this disclosure, the period between sync signals 214, i.e., the period between time $T_A$ and time $T_B$, is to be considered a "frame" of data. Also for the purpose of this disclosure, a "sync signal" is defined as any pattern of bits that a given system or processing standard uses to determine timing, e.g., frame boundaries.

FIG. 1B depicts details of a portion of the periodic sync signals 214 including a BD sync identification (ID) 220 having a known and predictable sequence, and a 9T/9T standard sync pattern 230 having nine NRZI "1's" followed by nine NRZI "0's" noting that the length of payload data and the format of a sync signal can change from example to example depending on the particular data standard employed. For example, an example CD reading system would employ payload data of 588 bits/frame and an 1T/11T sync signal.

In practice, encoded data can be correctly decoded once the location of an embedded sync signal/pattern is identified assuming that the number of errors in the data stream is lower than those that are correctable by an Error Correction Code (ECC) decoder.

However, if the sync signal location is incorrectly identified, then most of the data provided by the ECC decoder will be incorrect and uncorrectable even in situations where the bulk of the NRZI data is error free. If such a scenario is caused by a particular hardware-implemented sync detection, then it is possible to correct for the problem by using a firmware-based solution to flexibly pre-process the NRZI encoded data to remove bit errors before re-processing using the hardware-implemented sync detection. Such a firmware/hardware hybrid system enables flexible error-correction where a hardware-only approach having the same capacity would be too complex and expensive.

The following examples of the disclosed methods and systems are directed to an enhanced BluRay (BD) optical disc reading system employing NRZI encoding. However, it is to be appreciated in light of this disclosure that the following concepts may be applied to a large variety of other systems using NRZI or other encoding techniques, such as Digital Video Disc (DVD) readers, Compact Disc (CD) readers, other optical reading systems, magnetic and other storage systems, communication systems, and any other known or later developed data storage or transfer system capable of using data encoding and sync signals.

FIG. 2 is an example of a BD storage system 100 capable of employing frames of NRZI encoded data and sync signals, such as those data and sync signals described above and depicted in FIGS. 1A and 1B. The storage system 100 includes a data source 110, a data channel 120, an enhanced optical disc controller (ODC) 130, error correction coding (ECC) circuitry 140, and a data sink 150. The enhanced optical disc controller 130 includes a firmware (FW) module 132, a hardware (HW) module 134, and demodulator (DE-MOD) circuitry 136.

In operation, the example data source 110, which may be a BluRay Disc, provides a stream of input data to the data channel 120, which in turn provides the stream of input data to the enhanced ODC 130. For the purpose of this example, the input data stream is formatted according to BluRay specifications using non-return to zero, inverted (NRZI) coding having frames of length 1932 bits with 9T/9T sync signals as is shown in greater detail in FIGS. 2A-2B discussed above.

The enhanced ODC 130 processes the received input data stream using fast (but limited) dedicated/fixed hardware circuitry incorporated in the HW module 134 and, when necessary, by more versatile (but slower) firmware-based processing using the FW module 132 to produce a stream of processed data and sync timing signals.

The stream of processed data is then provided to the ECC circuitry 140 to produce a stream of corrected data, which in turn is provided to the data sink 150.

Figure 3:
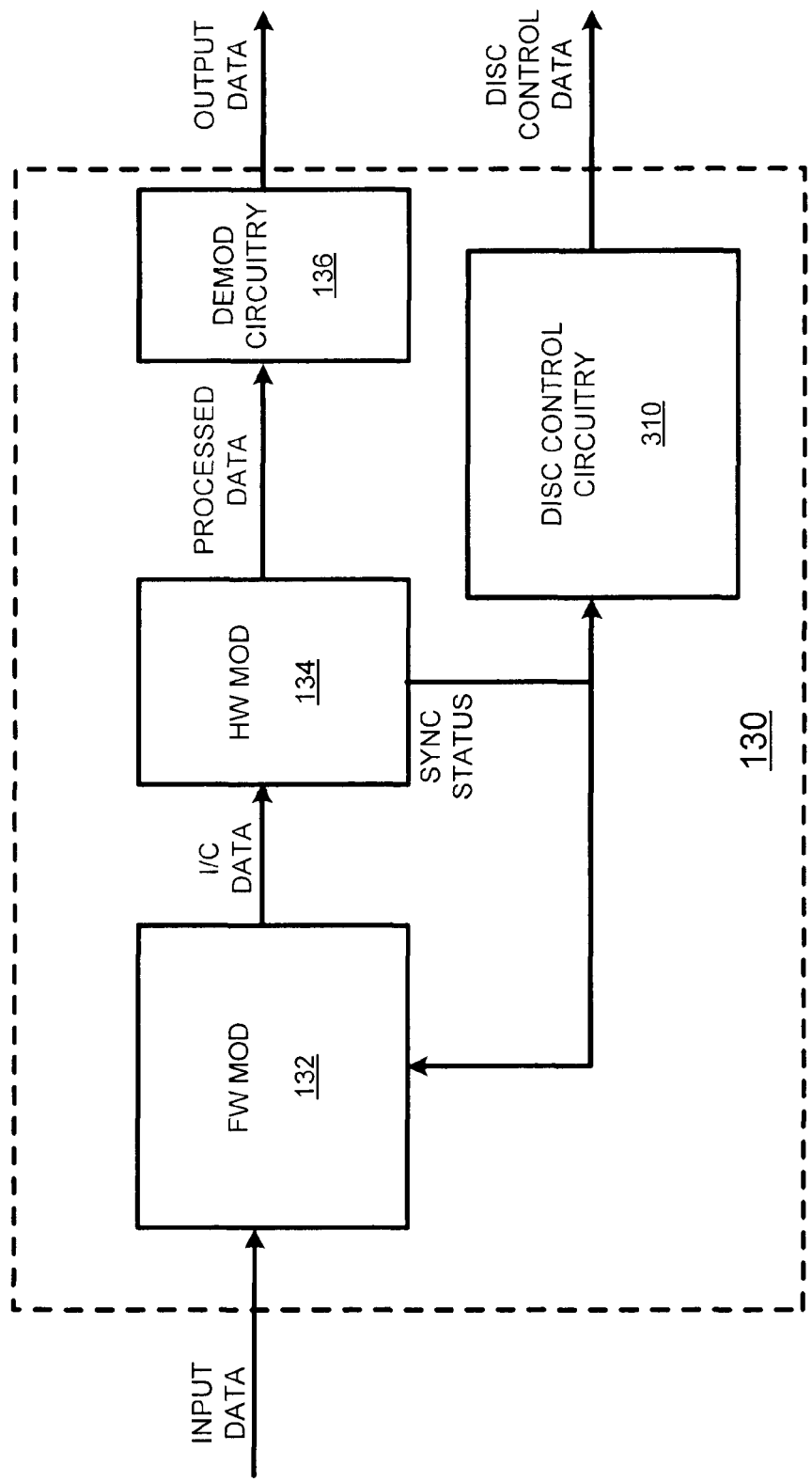
FIG. 3 shows details of the example enhanced optical disc controller of FIG. 2.

FIG. 3 shows details of the example enhanced optical disc controller 130 of FIG. 2. Again, the example enhanced optical disc controller 130 includes a FW module 132, and a IIW module 134 and DEMOD circuitry 136, as well as disc control circuitry 310.

In operation, input/received data, e.g., NRZI encoded data having frames that include payload data of 1932 bits and a sync signal having a sync ID and 9T/9T sync pattern, is provided to the FW module 132.

In normal operation, the input/received data will pass through the FW module 132 to the HW module 134 unchanged to the HW module 134 where after the HW module 134 will process the received data while attempting to detect embedded sync signals.

Should the HW module 134 successfully detect a sync signal, which includes successfully detecting a correct sync ID followed by a 9T/9T pattern, then the HW module 134 will provide processed data to the DEMOD circuitry 136, while providing a successful SYNC STATUS signal to the disc control circuitry 310 and to the FW module 132.

However, should the HW module 134 fail to successfully detect a sync signal, then the HW module 134 will provide an unsuccessful SYNC STATUS signal to the disc control circuitry 310 and to the FW module 132. Such an unsuccessful SYNC SIGNAL can cause the disc control circuitry 310 to re-read the last frame(s) of data, and cause the FW module 132 to intercept such re-read frame(s) of data and pre-process such data. In varying examples, such pre-processing by the FW module 132 can completely correct (or at least compensate for) a given frame of data, or may only partially correct a given frame allowing the HW module 134 to complete data correction and/or sync detection.

The FW module 132 is capable of flexibly detecting sync signals in the face of bit errors beyond the capability of the HW module 134 to resolve, although at a slower rate that makes full-time processing by the FW module 132 impracticable.

In various examples, the FW module 132 can perform at least the following non-limiting processes:

(1) Insert or delete bits on short frames assuming that the HW module 134 cannot correctly process/adjust. For example, should a particular frame of data be three bits too short (i.e., 1929 bits), the FW module 132 can pad the short frame and pass the padded frame to the HW module 134.

(2) Fix erroneous sync IDs assuming that the HW module 134 cannot correctly identify the proper sync ID by itself.

(3) Insert/delete frames when a write overwrite/gap longer than a "few bits" exists assuming that the actual data inserted is not critical as long as sufficient bits, sync patterns and sync ID are inserted so that the hardware implementation can correctly decode the ECC block/cluster.

Typically, the meaning of a "few bits" can vary depending on the optical standard used. However, for the purpose of this disclosure, a "few bits" can be defined as the maximum number of erroneous bits for which a hardware-based processor can successfully compensate. This, of course, may be a design choice with an observation that the more bits that a hardware-based processor is designed to resolve, the more expensive the hardware-based processor is likely to be. Similarly, the term "sufficient bits" may be defined as the number of bits needed to be added/removed for which a hardware-based processor can then successfully compensate.

(4) Fix erroneous sync patterns assuming that sufficient information is available to pinpoint an exact location of such a pattern, and when not detecting such pattern affects the demodulated data in such a manner that it leads to failures or errors on that frame.

Figure 4:
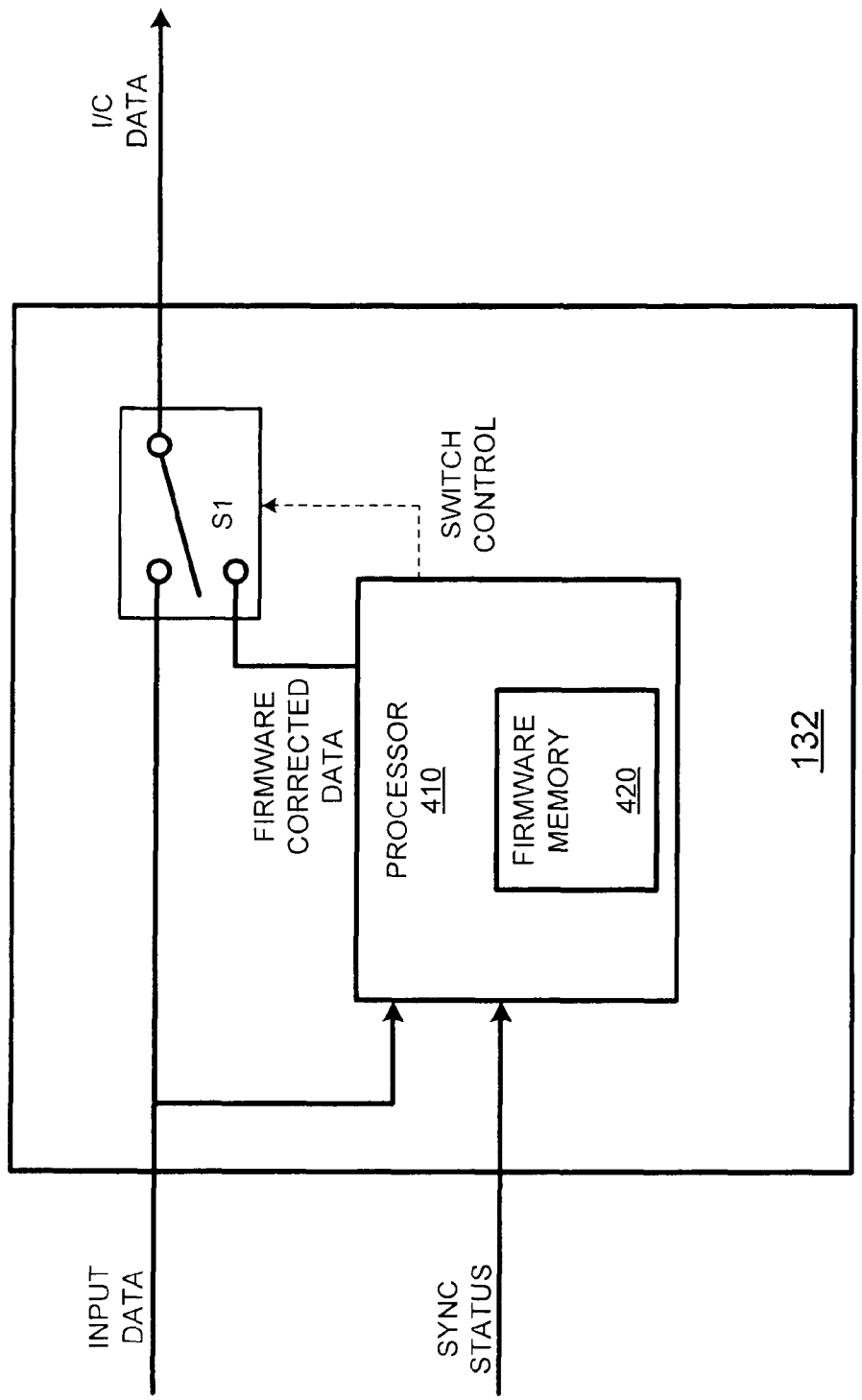
FIG. 4 shows details of the example firmware processing module of FIG. 3.

FIG. 4 shows details of the example FW module 132 of FIG. 3. As shown in FIG. 4, the FW module 132 includes switch S1 and a processor 410 with firmware memory 420 enabling flexible, if relatively slow, error correction and/or sync detection.

In operation, the FW module 134 receives the stream of input data as described above, and provides such stream of received data to switch S1 and to the processor 410.

Assuming that SYNC STATUS signal indicates that a respective HW module can successfully resolve/detect an embedded sync signal, then the processor 410 will command switch S1 to pass the received stream of data through to the HW module as signal I/C DATA ("Input or Corrected DATA").

However, should the SYC STATUS signal indicate that the respective HW module cannot successfully resolve/detect an embedded sync signal, then the processor 410 will perform the appropriate pre-processing to the input data to produce firmware corrected/compensated data, and command switch S1 to pass the firmware corrected data to the HW module as signal I/C DATA.

Figure 5:
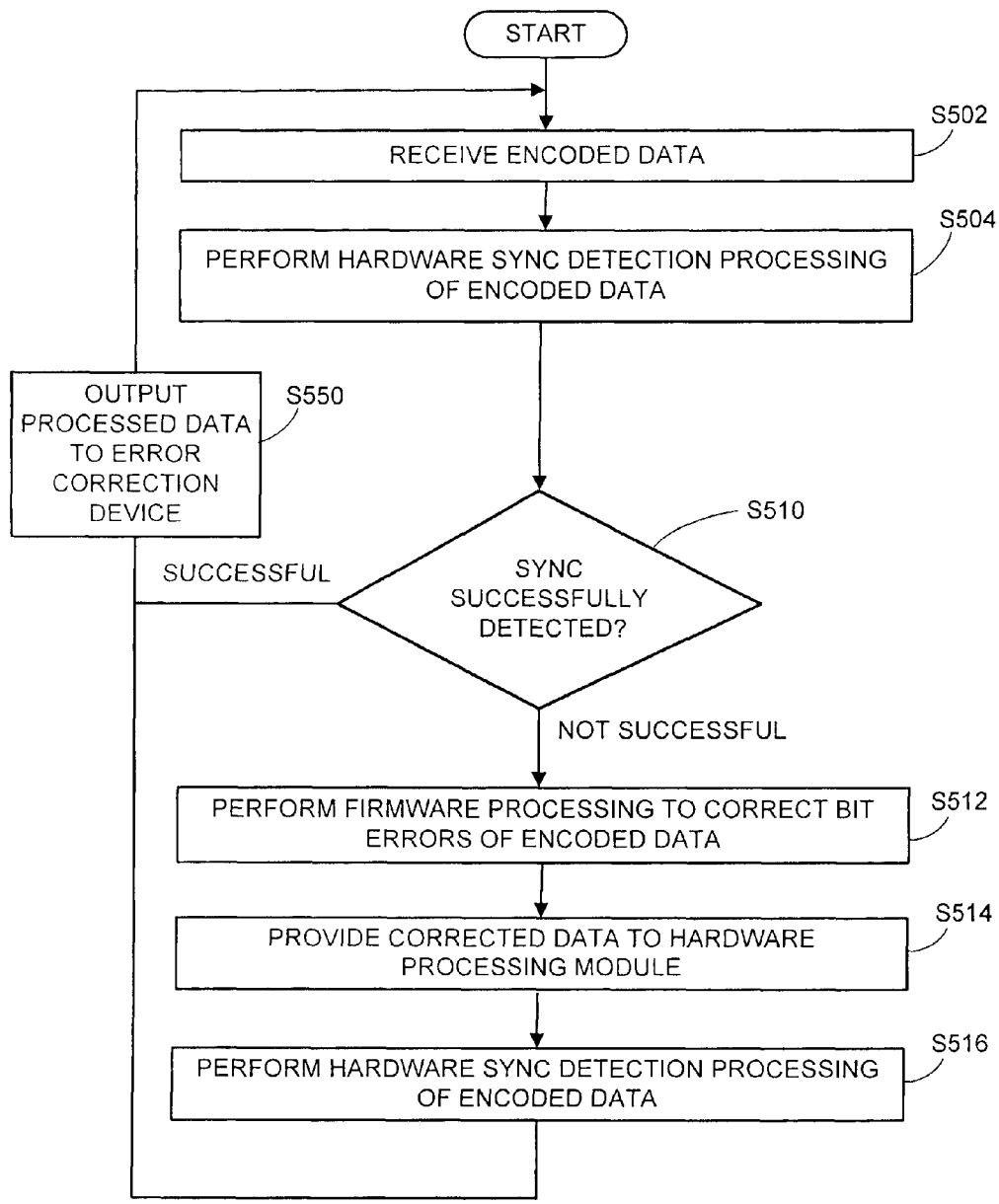
FIG. 5 is a flowchart outlining an example approach for correcting sync errors.

FIG. 5 is a flowchart outlining an example approach for detecting sync errors in a stream of encoded frames of data. The process starts at S502 when a received data stream containing a frame of NRZI (or other) encoded data, including payload data and sync signal, is received. Next, at S504, dedicated hardware-based processing is performed to detect the sync signal within the received stream of data.

At S510, a determination is made as to whether the sync signal was correctly detected/resolved at S504. If the sync signal was correctly detected/resolved, then at S550 the hardware-processed data produced at S504 (with sync timing) is output to an error correction device; otherwise, control continues to S512 where a firmware-based processing device is used to pre-process the received data stream of S502 so as to correct for errors in the that the hardware-based processing at S504 cannot.

At S514, a firmware-corrected stream of data produced at S512 is provided to the hardware module so as to allow the hardware module to further process the firmware-corrected stream of data so as to correctly/accurately detect the timing of the embedded sync signal. Then, at S516, dedicated hardware-based processing (similar or identical to that at S504) is performed on the pre-processed data stream to detect the sync signal within the firmware pre-processed data stream. Control then jumps back to S550 where the processed data (with sync timing) is output to an error correction device.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A system for processing data, comprising:
a hardware module configured to detect a sync signal embedded in an input stream of data passed from a firmware-based module to the hardware module unchanged and to produce an output stream of data; and
the firmware-based module configured to correct errors in the input stream of data independently from the hardware module when the hardware module is incapable of correctly detecting the sync signal to the errors in the input stream of data.

2. The system of claim 1, wherein the firmware-based module is configured to correct for bit errors that the hardware module is incapable of correcting.

3. The system of claim 2, wherein the firmware-based module is configured to correct for sync errors caused by one or more bit errors in a sync identification (ID) embedded in the sync signal that the hardware module is incapable of correcting.

4. The system of claim 2, wherein the firmware-based module is configured to correct for sync errors caused by one or more bit errors in a sync pattern embedded in the sync signal that the hardware module is incapable of correcting.

5. The system of claim 2, wherein the firmware-based module is configured to resolve sync errors caused by an erroneous payload data length of the input stream of data that the hardware module is incapable of correcting.

6. The system of claim 1, wherein the hardware module and the firmware-based module are both configured to resolve errors found in streams of data produced by optical readers.

7. The system of claim 1, wherein the firmware-based module is configured to provide at least a partially corrected input stream of data to the hardware module, where after the hardware module processes the at least partially corrected input stream of data to detect the sync signal.

8. The system of claim 7, further comprising error correction circuitry configured to use the detected sync signal to perform error correction to produce a stream of corrected data.

9. The system of claim 1, wherein the system is directed to one of an optical disc reading system, a magnetic storage system, and any data storage or transfer system capable of using data encoding and sync signals.

10. The system of claim 9, wherein the optical disc reading system employs non-return-to-zero inverted (NRZI) encoding technique.

11. A method for processing data, comprising:
passing an input stream of data from a firmware-based module to a hardware module unchanged;
detecting a sync signal embedded in the input stream of data by the hardware module;
producing an output stream of data based on the detected sync signal; and
correcting errors in the input stream of data independently from the hardware module by the firmware-based module when the hardware module is incapable of correctly detecting the sync signal due to the errors in the input stream of data.

12. The method of claim 1, further comprising:
correcting, by the firmware-based module, bit errors that the hardware module is incapable of correcting.

13. The method of claim 12, further comprising:
correcting, by the firmware-based module, sync errors caused by one or more bit errors in a sync identification (ID) embedded in the sync signal that the hardware module is incapable of correcting.

14. The method of claim 12, further comprising:
correcting, by the firmware-based module, sync errors caused by one or more bit errors in a sync pattern embedded in the sync signal that the hardware module is incapable of correcting.

15. The method of claim 12, further comprising:
resolving, by the firmware-based module, sync errors caused by an erroneous payload data length of the input stream of data that the hardware module is incapable of correcting.

16. The method of claim 11, wherein the hardware module and the firmware-based module are both configured to resolve errors found in streams of data produced by optical readers.

17. The method of claim 11, further comprising:
providing, by the firmware-based module, at least a partially corrected input stream of data to the hardware module; and
processing the at least partially corrected input stream of data to detect the sync signal by the hardware module.

18. The method of claim 17, further comprising:
using the detected sync signal to perform error correction to produce a stream of corrected data.

19. The method of claim 11, wherein the method is directed to one of an optical disc reading system, a magnetic storage system, and any data storage or transfer system capable of using data encoding and sync signals.

20. The method of claim 19, wherein the optical disc reading system employs non-return-to-zero inverted (NRZI) encoding technique.

* * * * *